US 6,672,724 B1

(12) United States Patent
Peterson et al.

(10) Patent No.: US 6,672,724 B1
(45) Date of Patent: Jan. 6, 2004

(54) PROJECTION SYSTEM WITH INTEGRATED OPTICAL DEVICE

(75) Inventors: Mark Peterson, Lake Oswego, OR (US); Jeff Gohman, Hillsboro, OR (US)

(73) Assignee: InFocus Corporation, Wilsonville, OR (US)

( * ) Notice: Subject to any disclaimer, the term of this patent is extended or adjusted under 35 U.S.C. 154(b) by 166 days.

(21) Appl. No.: 10/040,870

(22) Filed: Dec. 27, 2001

(51) Int. Cl.[7] ............................................. G03B 21/28
(52) U.S. Cl. ........................................................ 353/81
(58) Field of Search .............................. 353/98, 99, 112, 353/31, 34, 37, 102; 385/11, 34, 133, 146, 901, 131, 130, 123; 348/742, 743, 771

(56) References Cited

U.S. PATENT DOCUMENTS

| | | | |
|---|---|---|---|
| 5,146,248 A | | 9/1992 | Duwaer et al. ............ 353/122 |
| 5,625,738 A | * | 4/1997 | Magarill ..................... 359/503 |
| 5,634,704 A | * | 6/1997 | Shikama et al. ............ 353/102 |
| 5,884,991 A | * | 3/1999 | Levis et al. ..................... 349/9 |
| 6,247,816 B1 | * | 6/2001 | Cipolla et al. ................ 353/20 |
| 6,343,862 B1 | * | 2/2002 | Sawai et al. .................... 349/8 |

* cited by examiner

*Primary Examiner*—William Dowling
(74) *Attorney, Agent, or Firm*—Schwabe, Williamson & Wyatt, P.C.

(57) ABSTRACT

An integrated prism-based optical device for a projection system performs light integration, beam shaping, and input/output beam separation. The integrated optical device preferably includes a light integrator tunnel with a first lens located adjacent one end and a prism located adjacent an opposite end. A second lens is located adjacent another side. The individual elements are preferably secured together using an index matching adhesive to form a unitary optical device. The integrated optical device is compact and provides uniform, high intensity light to the display device. The integrator tunnel may have a wedge or frustum shape eliminating the need for the first lens. The integrated optical device allows for a projector that requires fewer parts, is lighter weight, more compact, less costly, and more easily assembled than prior projection systems.

20 Claims, 2 Drawing Sheets

PROJECTION SYSTEM WITH INTEGRATED OPTICAL DEVICE

RELATED APPLICATIONS

None

FEDERALLY SPONSORED RESEARCH OR DEVELOPMENT

None

TECHNICAL FIELD

This invention relates to color sequential video and multimedia projectors and more particularly to a prism-based optical engine that performs light beam integration, beam shaping, and input/output light separation.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction.

In a common operating mode, multimedia projection systems receive analog video signals from a personal computer ("PC"). The video signals may represent still, partial-, or full-motion display images of a type rendered by the PC. The analog video signals are typically converted in the projection system into digital video signals that control a digitally driven image-forming device, such as a liquid crystal display ("LCD") or a digital micro mirror device ("DMD").

It is becoming more important to provide a display system that is compact but that provides a high-quality image. Significant effort has been invested into developing projectors producing bright, high-quality, color images. However, it is difficult to obtain a suitable projected image, especially when using compact portable color projectors in a well-lighted room. For example, current display systems are heavy and bulky because of the number of required optical elements and the placement and spacing of the optical elements.

FIG. 1 shows such a system. An image projector 10 includes a high power lamp 12 positioned at the focus of an elliptical reflector 14 to produce a high intensity illumination beam characterized by a principal ray 16 that propagates through a rotating color wheel disk 18 of a color wheel assembly 20. Disk 18 includes at least three sectors, each tinted in a different one of three primary colors to provide a field sequential color image capability for image projector 10. The illumination beam propagates through an integrator tunnel 22 to create at its output end a uniform illumination pattern.

The illumination beam propagates from integrator tunnel 22 through lens elements 24 and 26 and is directed by a mirror 32 that is inclined so that the illumination beam propagates upwardly at a 45 degree angle relative to the plane of the supporting table for image projector 10. After reflection by mirror 32, principal ray 16 propagates through lens element 28 toward a prism assembly 40. Prism assembly 40 is composed of prism components 42 and 44 that are spaced apart by an interface 46.

An incident light beam derived from principal ray 16 propagates through prism component 42 and, by total internal reflection, reflects off of a surface at air space interface 46 to form a reflected incident light beam. The reflected incident beam propagates through prism component 42 to strike light valve 30. Light valve 30 reflects an imaging light beam propagating normal to the plane of light valve 30 through prism component 42 and, without total internal reflection, through interface 46 into prism 44 to exit through an exit face 60 of prism component 44. The imaging light beam that passes through exit face 60 is characterized by a principal ray 62 and propagates through a projection lens 64 to a projector screen (not shown) to display an image to a viewer.

As can be seen, this architecture employs many optical elements to integrate the light and to reflect, redirect, and transmit various polarized light or light rays depending on whether they propagate in a direction toward a display device. These optical elements add weight and bulk to the display system and are more costly to manufacture and more time consuming to assemble. Additionally, the arrangement of the components, such as, for example, the necessary upward inclination of prism assembly 40, dictates for a housing (not shown) a minimum height that is greater than desired.

What is needed, therefore, is a compact, light weight, low-profile multimedia projection system that achieves a bright, high-quality projected image at a relatively low cost.

SUMMARY OF THE INVENTION

An object of this invention is, therefore, to provide a multimedia display device having a simplified prism-based optics system.

Another object of the invention is to provide a multimedia projector in which the prism assembly is a totally integrated system that performs light integration, beam shaping, and input/output beam separation.

A further object of the invention is to provide a multimedia projector that eliminates the need for optical components to relay the image from the integrator onto a display device.

Still another object of the invention is to provide a multimedia projector that can be used with a transmissive or reflective LCD or a DMD.

Yet another object of this invention is to provide a multimedia projector that requires fewer parts, is lighter weight, more compact, less costly, and more easily assembled than prior projection systems.

A frame sequential color display projection system of this invention includes an arc lamp having a predetermined power rating for providing a source of polychromatic light that propagates through a color wheel that sequentially provides R, G, B, and optionally, W light colors during respective sequential time periods. A display controller is synchronized with the color wheel to generate color image data during the respective time periods. The light propagates through an integrated prism-based optical device that performs light integration, beam shaping, and input/output beam separation to create a uniform illumination pattern and to direct light toward or away from a display device.

In the preferred embodiment, the integrated optical device includes a light integrator tunnel with a first lens abutting one end of the light integrator tunnel. A prism is positioned in an abutting relationship at one side to the opposite end of the integrator tunnel, and a second lens abuts another side of the prism. Preferably, the individual elements are secured together using an index matching adhesive that matches the refractive index of the optical elements, which are typically made of glass so that together the integrator tunnel, prism, and lenses form a unitary element.

The integrated optical device is positioned within the projection system with one end adjacent to the color wheel and the opposite end closely adjacent to the display device. The close proximity of the integrated optical device to the display device eliminates the need for additional optical elements to reimage the light onto the display device. Additionally, placement of the integrated optical device adjacent the display device provides uniform, high intensity light from the color wheel to the display device.

In addition to integrating the incoming light from the lamp, the integrated optical device decreases the angular direction of the light as it propagates through the integrated optical device. This allows the use of an F1 reflector, which is a small reflector with a short working distance resulting in a smaller and more compact projection device. The second lens element reduces polarization losses associated with some light valves but may be eliminated depending on the type of light valve used.

The integrator tunnel may have a wedge or frustum shape that eliminates the need for the first lens because the wedge or frustum shape performs the function of reducing the incident angle of the incoming light. Depending on the type of light valve employed, it may not be necessary to use lenses. However, it may be necessary to use a lens between the prism and display device to reduce polarization losses associated with some light valves.

Additional objects and advantages of this invention will be apparent from the following detailed description of preferred embodiments thereof that proceeds with reference to the accompanying drawings.

Additional aspects and advantages of this invention will be apparent from the following detailed description of preferred embodiments thereof, which proceeds with reference to the accompanying drawings.

DETAILED DESCRIPTION OF PREFERRED EMBODIMENTS

Figure 1:
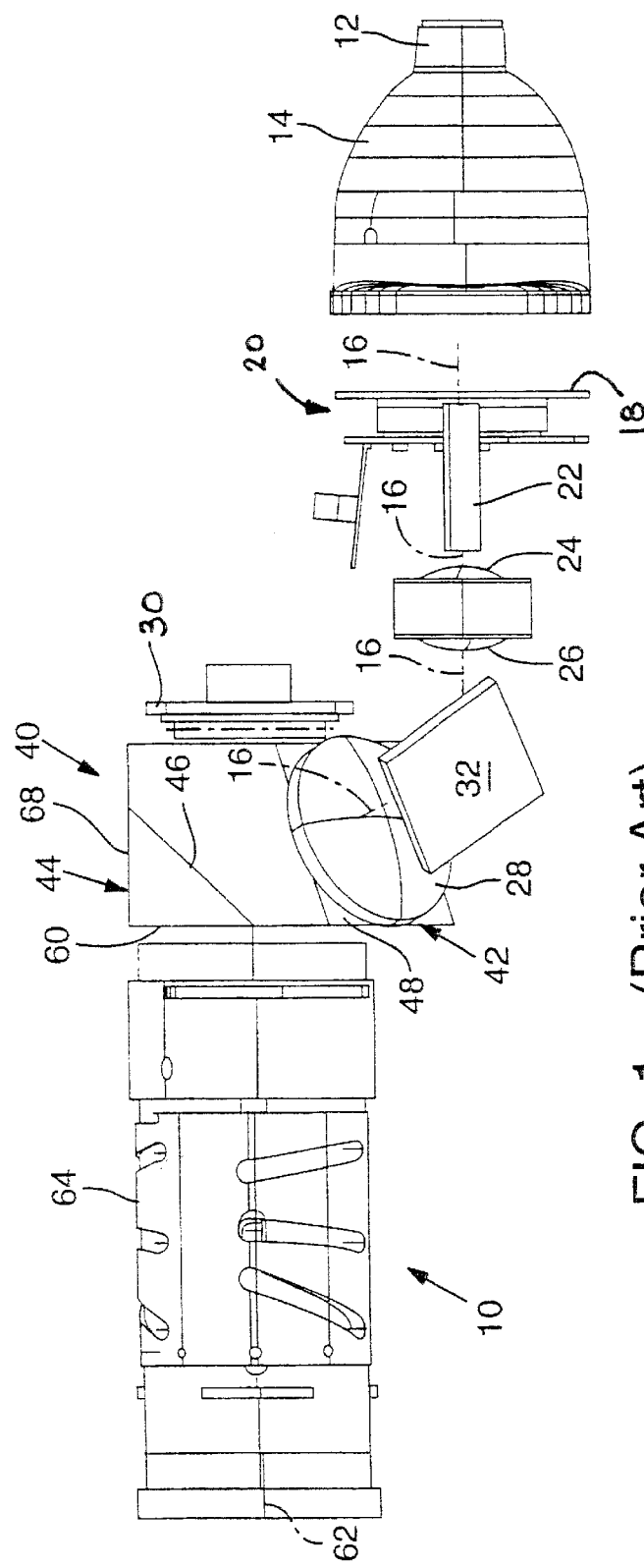
FIG. 1 is a simplified pictorial plan view of a prior art multimedia projector.
Figure 2:
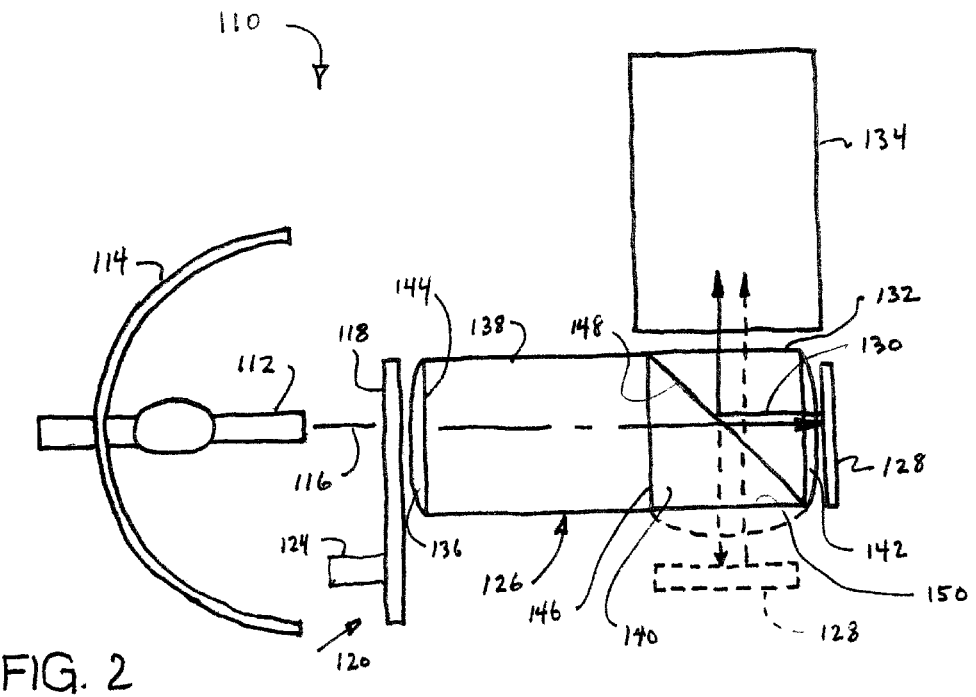
FIG. 2 is a simplified pictorial plan view of a multimedia projector showing a preferred embodiment of the unitary optical integrator.

FIG. 2 shows a preferred embodiment of an image projection system 110 of this invention that includes a high power arc lamp 112 positioned at a focus of an elliptical reflector 114 having an F-number that produces a high intensity illumination beam that is characterized by a principal beam 116. Arc lamp 112 is preferably a 270 watt, high pressure mercury arc lamp, which is suitable for use in an image projector to achieve its lifetime and lumen specifications. The mercury arc lamp has a nominal 1.3 mm arc gap, which contributes to high efficiency operation of the projector engine of image projection system 110. The small size of the arc gap impacts the alignment of the lamp arc to the rest of the optical system and increases the importance of the stability of the arc itself. Arc lamp 112 is preferably a model SHP 270, manufactured by Phoenix, located in Himeji City, Japan.

Arc lamp 112 is positioned at the first focus of elliptical reflector 114, which has a cold mirror that reflects forward only visible light. Much of the infrared and ultraviolet light is transmitted and absorbed in the housing of elliptical reflector 114. Color wheel disk 118 includes R, G, and B segments and is rotated by a motor 124 at about 5,600 to 7,500 rpm, which is twice the range of system video image refresh rates, to sequentially display R, G, and B images on a projector screen (not shown). Color wheel disk 118 may also include a W (actually clear) segment that functions to increase lumens. All segments of color wheel disk 118 carry ultraviolet reflective coatings to prevent ultraviolet light from reaching ultraviolet light sensitive components in the optical system. The beam 116 propagates through an integrated optical device 126 and onto a light valve 128. The light valve 128 reflects an imaging light beam 130 propagating normal to the plane of light valve 128 to pass through an exit face 132 of the integrated optical device 126. The imaging light beam 130 that passes through the exit face 132 propagates through a projection lens 134 to a projector screen (not shown) to display an image to a viewer.

In the preferred embodiment of FIG. 2, the integrated optical device 126 includes a first lens 136, an integrator tunnel 138, a prism 140, and a second lens 142. These elements are preferably made of glass and are located in an abutting relationship. Preferably, they are secured together by an index matching adhesive that has a refractive index matching that of the glass. Integrator tunnel 138 has an input end 144 and an output end 146 and creates at its output end 146 a uniform illumination pattern and facilitates delivery of the illumination light beam to the prism 140. Integrator tunnel 138 is composed of a solid glass that relies on total internal reflection to transfer light through it. The integrator tunnel 138 has a substantially constant cross section along its length so that the input end 144 and output end 146 have substantially the same dimensions. The light enters the input end 144 through first lens 136. The first lens 136 decreases the angular direction of the light as it propagates from the color wheel 118 through the first lens 136 and to the integrator tunnel 138. The light propagates through the integrator tunnel 138 and is reflected many times within the integrator tunnel 138 in order to homogenize the light into a beam having a uniform intensity. Integrator tunnel 138 may also include a cladding that supports the integrator tunnel 138 without disrupting total internal reflection. The uniform illumination pattern of light propagating from the output end 146 is of a shape that corresponds to the light valve 128. In other words, the integrator tunnel 138 shapes the beam through internal reflectance to have the same aspect ratio as the light valve 128.

The prism 140 is located at the output end 146 of the integrator tunnel 138 at a side that is dimensioned to substantially match that of the output end 146. The prism 140 is made of glass and has an interface 148 such as, for example, a PBS coating, an air gap creating a TIR interface, or other interfaces such as, for example, dichroic coatings, diffractive surfaces, waveplates, or polarizers depending on which type of display device is used. For example, in the preferred embodiment, the light valve 128 is a LCD. Skilled workers would know that if the display device is a LCD the prism 40 typically includes a PBS interface. The beam 116 propagates directly from the integrator tunnel 138 through the prism 140 and second lens 142 and onto the light valve 128. The second lens 142 converges the light exiting the prism 140 so that the light properly strikes the surface of light valve 128. The light valve 128 reflects the light beam back through the second lens 142, which again converges the light to prevent internal reflection within the prism 140 to reduce polarization losses associated with the use of LCDs. The prism 140 redirects the light rays according to the polarization direction of the light either away from the projection lens 134 or through it to project an image onto a screen (not shown).

Tracing the path of light rays from the lamp 112 through the system will best help an understanding of the function of the integrated optical device 126 and its components. The light beam 116 from the arc lamp 112 is directed through the color wheel 118 and into the input end 144 of the integrator tunnel 138. The integrator tunnel 138 concentrates and shapes the beam to provide uniform light intensity and to direct the light through the output end 146 and directly into the prism 140 to the light valve 128 at a substantially normal incident angle. For example, light entering the integrator tunnel 138 may have an incident angle of about 30 degrees. The light exiting the integrator tunnel 138 may have an incident angle of about 10 degrees.

The light rays that are received by the light valve 128 must be linearly polarized but light rays reflected from the light valve 128 having the same polarization direction must be excluded from the image forming beam directed to the projection lens 134. As is known, application of voltage to the LCD causes a rotation of polarization of light rays so that only light rays in which polarization has been reversed are selected to form the projected image. This function is carried out in the prism 140.

Although the elements are seen in FIG. 2 as being aligned so that the light travels in along a substantially straight path from the lamp 112 to the display device 128, alternative arrangements are possible. For example, skilled workers would know to arrange the second lens 142 and the light valve 128 on another side 150 of the prism 140 as seen in phantom in FIG. 2.

By positioning the integrator tunnel 138, prism 140, and first and second lenses 136 and 142 in an abutting relationship and, preferably, adhering them into a single unitary element, the integrated optical device 126 can be placed in close proximity to both the color wheel 118 and the light valve 128. This provides a tight illumination pattern and provides for a more compact projection system.

The system described above is one in which the light valve 128 is a LCD. However, skilled workers would know and understand that the light valve 128 may be a DMD, in which case the prism 140 would have a TIR interface. Additionally, since polarization losses are not a concern with DMDs, the second lens 150 may be eliminated.

Figure 3:
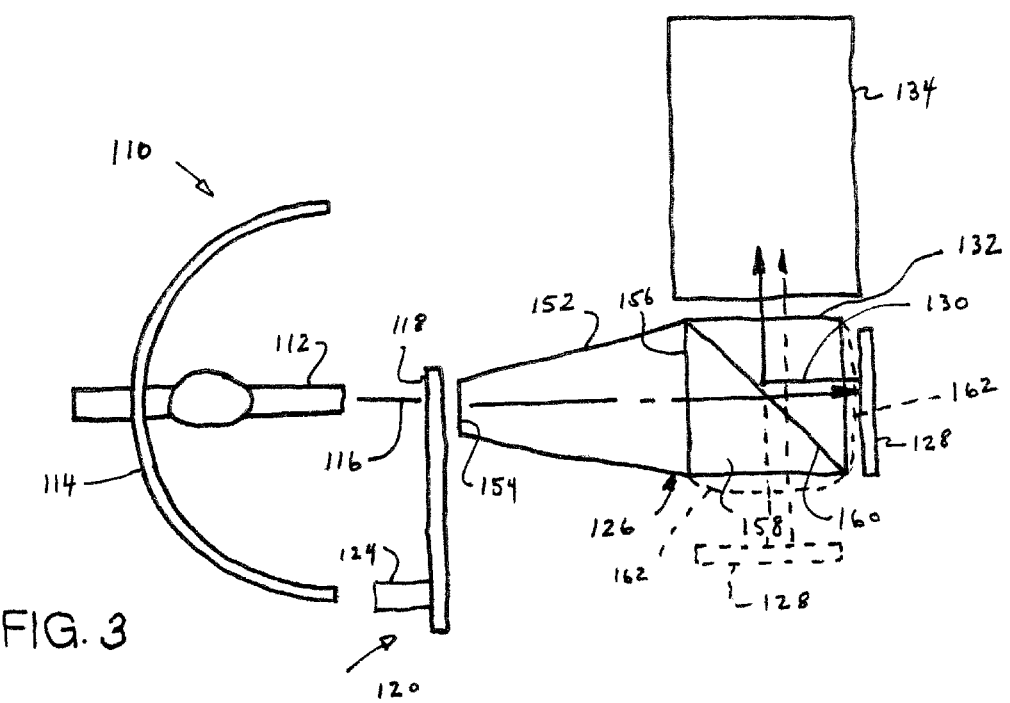
FIG. 3 is a simplified pictorial plan view of a multimedia projector showing an alternative embodiment of the unitary optical integrator.

An alternative embodiment is seen in FIG. 3 in which an integrator tunnel 152 has a wedge or frustum shape having an input end 154 of smaller cross section than an output end 156. The frustum shape is advantageous in that it performs the dual functions of decreasing the angular direction of the incoming light and integrating the light. In the previous embodiment of FIG. 2, these two functions were carried out by the first lens 136 and the integrator tunnel 138. Thus, the wedge or frustum-shaped integrator tunnel 152 eliminates the necessity of having a lens at the input end 154. The output end 156 delivers a uniform illumination light beam to a prism 158. The prism 158 abuts the integrator tunnel 138 at one side having a dimension that substantially matches that of the output end 156. It is preferred that the integrator tunnel 152 and prism 158 are secured with an index matching adhesive. As with the integrator tunnel of FIG. 2, wedge or frustum-shaped integrator tunnel 152 is composed of a solid glass that relies on total internal reflection to light through it. The light enters the narrow input end 154 and is reflected many times in order to homogenize the light into a beam having a uniform intensity. The uniform illumination pattern of light propagating from the wide output end 156 is of a shape that corresponds to the light valve 128. In this embodiment, it is preferred that the light valve 128 be a DMD, in which case the prism 158 would have a TIR interface 160. However, skilled workers would know that a LCD could be employed as the light valve 128, in which case the prism 158 would have a PBS interface. Additionally, since polarization losses are a concern with the use of LCDs a lens element (shown in phantom in FIG. 3) is located at a side of the prism 158 facing the LCD. Furthermore, the location of the light valve 128 could be at another side 164 of the prism as shown in phantom in FIG. 3.

It will be obvious to those having skill in the art that many changes may be made to the details of the above-described embodiments of this invention without departing from the underlying principles thereof. The scope of the present invention should, therefore, be determined only by the following claims.

What is claimed is:

1. An integrated optical device for use in an image projection system that includes a light source for emitting a light beam that propagates along an optical path through the integrated optical device and is received by a display device that produces a color image, comprising:
   a light integrating tunnel having an input end and an output end; and
   a prism component having first and second sides, the first side secured to the output end of the light integrating tunnel with an adhesive so that the light beam propagates directly from the output end of the light integrating tunnel to the prism component.

2. The integrated optical device of claim 1 in which the light integrating tunnel and the prism component are made of glass having a refractive index, wherein the adhesive has a refractive index that substantially matches that of the light integrating tunnel and prism component.

3. The integrated optical device of claim 1 in which the light integrating tunnel is elongated and has a substantially constant cross section along its length so that the input end and the output end have substantially the same dimensions.

4. The integrated optical device of claim 1 further comprising a lens element abutting the input end of the light integrating tunnel.

5. The integrated optical device of claim 1 further comprising a first lens element adhesively secured to the input end of the light integrating tunnel and a second lens adhesively secured to the second side of the prism component.

6. The integrated optical device of claim 5 in which the adhesive used to secure the first lens to the light integrating tunnel and the second lens to the prism component is an index matching adhesive.

7. The integrated optical device of claim 1 in which the light integrating tunnel has a substantially frustum shape in which the input end has a smaller cross section than the output end.

8. The integrated optical device of claim 7 further comprising a lens element abutting to the second side of the prism component.

9. The integrated optical device of claim 8 in which the lens element is secured to the second side of the prism component with an index matching adhesive.

10. An integrated optical device for use in an image projection system that includes a light source for emitting a light beam that propagates along an optical path through the integrated optical device and is received by a display device that produces a color image, comprising:

a light integrating tunnel having an input end and an output end;

a first lens element adhesively secured to the input end of the light integrating tunnel;

a prism component having first and second sides, the first side abutting the output end of the light integrating tunnel so that the light beam propagates directly form the output end of the light integrating tunnel to the prism component; and a second lens adhesively secure to the second side of the prism component.

11. The integrated optical device of claim 10 in which the light integrating tunnel and the prism component are secured together with an adhesive.

12. The integrated optical device of claim 11 in which the light integrating tunnel and the prism component are made of glass having a refractive index, wherein the adhesive has a refractive index that substantially matches that of the light integrating tunnel and prism component.

13. The integrated optical device of claim 10 in which the light integrating tunnel is elongated and has substantially constant cross section along its length so that the input end and the output end have substantially the same dimensions.

14. The integrated optical device of claim 10 in which the adhesive used to secure the first lens to the light integrating tunnel and the second lens to the prism component is an index matching adhesive.

15. The integrated optical device of claim 10 in which the light integrating tunnel has a substantially frustum shape in which the input end has a smaller cross section than the output end.

16. An integrated optical device for use in an image projection system that includes a light source for emitting a light beam that propagates along an optical path through the integrated optical device and is received by a display device that produces a color image, comprising:

a light integrating tunnel having a substantially frustum shape, an input end, and an output end, the input end having a smaller cross section than the output end;

a prism component having first and second sides, the first side abutting the output end of the light integrating tunnel so that the light beam propagates directly from the output end of the light integrating tunnel to the prism component; and a lens element abutting to the second side of the prism component.

17. The integrated optical device of claim 16 in which the light integrating tunnel and the prism component are secured together with an adhesive.

18. The integrated optical device of claim 17 in which the light integrating tunnel and the prism component are made of glass having a refractive index, wherein the adhesive has a refractive index that substantially matches that of the light integrating tunnel and prism component.

19. The integrated optical device of claim 16 further comprising a lens element abutting the input end of the light integrating tunnel.

20. The integrated optical device of claim 19 in which the adhesive used to secure the first lens to the light integrating tunnel and the second lens to the prism component is an index matching adhesive.

* * * * *

UNITED STATES PATENT AND TRADEMARK OFFICE
CERTIFICATE OF CORRECTION

PATENT NO. : 6,672,724 B1
APPLICATION NO. : 10/040870
DATED : January 6, 2004
INVENTOR(S) : Peterson, Mark et al.

It is certified that error appears in the above-identified patent and that said Letters Patent is hereby corrected as shown below:

Col. 4, line 59, "...a LCD." should read --...an LCD.--;

Col. 4, line 60, "...a LCD..." should read --...an LCD...--;

Col. 5, line 45, "...a LCD." should read --...an LCD.;

Col. 6, lines 8-9, "...a LCD..." should read --...an LCD...--;

Col. 7, line 10, "...directly form..." should read --...directly from...--;

Col. 7, line 13, "...secure..." should read --...secured...--;

Col. 7, line 25, "...has substantially constant..." should read --...has a substantially constant...--.

Signed and Sealed this

Twenty-second Day of August, 2006

JON W. DUDAS
*Director of the United States Patent and Trademark Office*